United States Patent
Weeren et al.

(10) Patent No.: US 6,637,022 B1
(45) Date of Patent: *Oct. 21, 2003

(54) ENHANCED GRAPHICAL DEVELOPMENT ENVIRONMENT FOR CONTROLLING PROGRAM FLOW

(75) Inventors: Eric Weeren, Carrollton, TX (US); Myra Hambleton, Plano, TX (US)

(73) Assignee: Intervoice Limited Partnership, Reno, NV (US)

( * ) Notice: Subject to any disclaimer, the term of this patent is extended or adjusted under 35 U.S.C. 154(b) by 126 days.

This patent is subject to a terminal disclaimer.

(21) Appl. No.: 09/603,334

(22) Filed: Jun. 26, 2000

Related U.S. Application Data

(62) Division of application No. 09/310,442, filed on May 12, 1999, now Pat. No. 6,131,184, which is a division of application No. 08/599,134, filed on Feb. 9, 1996, now Pat. No. 5,946,485.

(51) Int. Cl.[7] .............................. G06F 9/44
(52) U.S. Cl. ................ 717/109; 345/763; 345/967; 709/328
(58) Field of Search ................ 345/967, 763, 345/970–972; 709/310, 328; 717/106, 107, 108, 109

(56) References Cited

U.S. PATENT DOCUMENTS

| | | | |
|---|---|---|---|
| 4,785,408 A | 11/1988 | Britton et al. | 364/513.5 |
| 4,827,404 A | 5/1989 | Barstow et al. | 364/200 |
| 5,524,246 A | 6/1996 | Hurley et al. | 395/700 |
| 5,537,630 A | 7/1996 | Berry et al. | 395/155 |
| 5,551,040 A | 8/1996 | Blewett | 395/700 |
| 5,678,013 A | 10/1997 | Smith et al. | 395/333 |
| 5,946,485 A * | 8/1999 | Weeren et al. | 717/3 |
| 6,131,184 A | 10/2000 | Weeren et al. | 717/2 |

OTHER PUBLICATIONS

Feng, et al., "Towards Collaborative Programming Environment: A Care Study on Visualization System," TENCON '94, IEEE, 1994, pp. 107–112, Aug. 1994.

Green et al., "A Language and System for Procedural Modeling and Motion," IEEE Comp. Graphics and Applications, IEEE, 1988.

Gross, "Graphical Constraints in CoDraw," IEEE, 1992, pp. 81–87, 1992.

Graf W. H. et al., "Constraint–Based Layout in Visual Program Design," Proc. IEEE Int'l Synp on Visual Languages, IEEE, pp. 116–117, dated Sep. 1995.

Heck, et al., "All the Screen's a Stage," Infoworld, pp. 100–114 dated Oct. 1994.

Glinest et al., "The User's View on SunPict, an Extensible Visual Environment for Immediate Scale Procedural Programming", Comp. System & Software Eng. Conf., pp. 49–58, 1989.

InterVoice, Inc.; InterForm User's Guide–Document No. 60.01.21, pp. 2–72, 3–73 and C–20; Dec. 1, 1994.

* cited by examiner

Primary Examiner—Tuan Q. Dam
(74) Attorney, Agent, or Firm—Fulbright & Jaworski L.L.P.

(57) ABSTRACT

A graphical development environment for developing the program flow of an application. The environment represents the program flow as an arrow between starting and end points. A developer can modify the program flow by adding an icon representing a subroutine to any point on the arrow. Loops and possible returns of a subroutine are graphically represented by the environment. If the developer modifies the API of a subroutine, the environment graphically represents the calling routines that are affected by the API change. The environment also allows functional components of subroutines to be overwritten by the caller. In such a case, the overwritten components are executing within the caller's environment space. Different overwritten instances of an overwritable subroutine may exist in the same program flow.

24 Claims, 3 Drawing Sheets

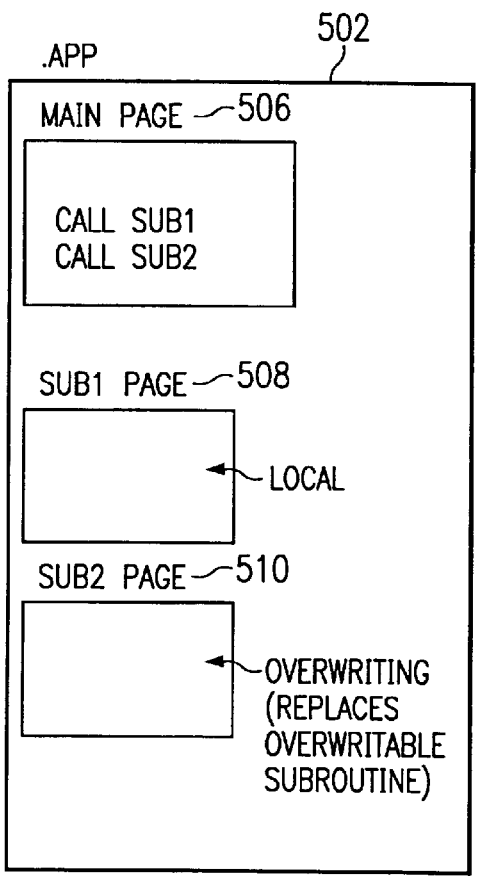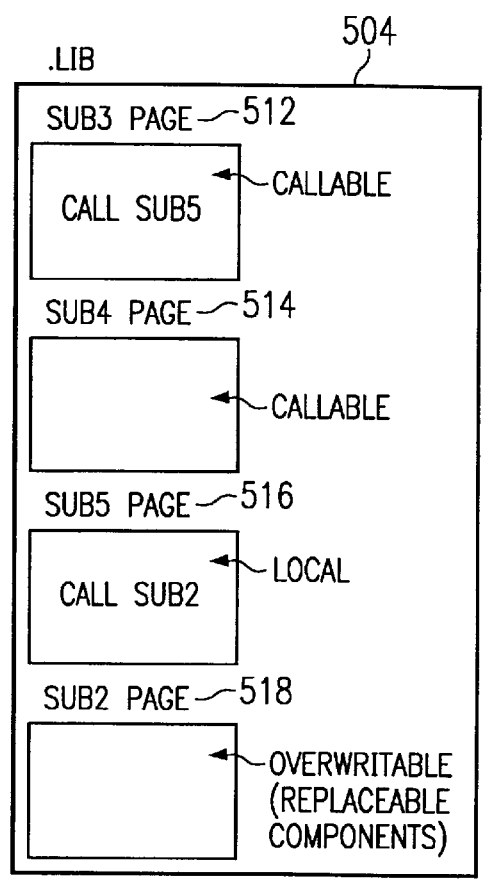
FIG. 5A                    FIG. 5B

ENHANCED GRAPHICAL DEVELOPMENT ENVIRONMENT FOR CONTROLLING PROGRAM FLOW

RELATED APPLICATIONS

This application is a divisional of application assigned Ser. No. 09/310,442 file date May 12, 1999 entitled, ENHANCED GRAPHICAL DEVELOPMENT ENVIRONMENT FOR CONTROLLING PROGRAM FLOW, now U.S. Pat. No. 6,131,184, which is a divisional of Ser. No. 08/599,134, filed Feb. 9, 1996, now U.S. Pat. No. 5,946,485, which is assigned to a common assignee, which application is hereby incorporated by reference herein.

TECHNICAL FIELD OF THE INVENTION

This invention relates in general to graphical development environments and more particularly to a graphical development environment for developing the program flow of a program which defines the interactions between a user and a computer to exchange information.

BACKGROUND OF THE INVENTION

Prior art development environments used scripting languages to control the flow of an application. The languages contained individual code constructs called subroutines. Usually, a caller would call a subroutine to perform a certain task, and then receive a return code from the subroutine indicating its result. The caller would then execute a conditional branch instruction conditioned on the return code.

Accordingly, a developer who used subroutines needed to be familiar with all possible return codes that were output by the subroutines. Moreover, the developer needed to design a lengthy branch statement that accounted for all possible returns. Thus, the developer needed to be intimately familiar with the parameters and possible results of the subroutines.

In order to reduce the burden on the developer, prior art development environments had reusable subroutines that performed certain frequently-needed tasks. However, to increase reuse, these subroutines needed to allow for the different conditions that occurred in different calling situations. Therefore, the reusable subroutines had to be parameterized. That is, parameters had to be passed to the subroutine to tell it how to react to different situations. As reusable subroutines grew in complexity, more and more parameters became required. Since the developer had to be familiar with each possible parameter, even reusable subroutines created a heavy burden. In addition, if the application program interface (API) of a reusable subroutine changed, the developer had the burden of locating and changing all of the existing calls to that subroutine.

More recent prior art development environments were graphical in nature. Such graphical development environments used icons to represent various language components. Developers would draw lines or arrows connecting these icons. These lines defined a program flow (call flow). In the prior art, the burden of icon line connection was placed on the developer. Thus, the mechanics of line drawings as well as familiarity with each icon's functionality were burdens to developing successful program flow. For example, icons that behaved as a loop would have different line behaviors than icons that behaved as a branch.

Furthermore, prior art graphical development environments represented a subroutine as an icon in a call flow having a single input line and a single output line, even if the subroutine had multiple return codes. Therefore, the developer still had to be familiar with each possible return code and had to provide a mechanism for dealing with each one.

Prior art non-graphical development environments provided a way to create complex user-defined subroutines without too many parameters: overwritable subroutines. A subroutine can be thought of as containing its various functionalities. Some of these functionalities are always present, others are modified by parameters, and still others can be overwritten by the caller. Prior art non-graphical development environments allowed these overwritable functionalities to be represented as additional subroutines with default functionality defined and invoked by the containing subroutines. The caller of the containing subroutines could replace the default functionality of an overwritable subroutine by providing a corresponding overwriting subroutine. Obviously, the overwritable and overwriting subroutines each shared the same parameters and return codes.

However, the usefulness of overwritable subroutines in prior art was hampered by several limitations. In particular: (1) a lack of graphical representation of overwritable and overwriting subroutines; (2) an overwriting subroutine could only use data that was passed through the pre-defined parameter list—an extreme barrier to extending the default behavior; and (3) overwriting subroutines could only be defined once, not once for each call to the containing subroutine.

Accordingly, there is a need in the art for a graphical development environment that automatically connects icons in accordance with the call flow functionality of the underlying language component.

There is also a need in the art for a graphical development environment that graphically displays subroutines having multiple returns in a manner that eases the burden on the developer.

There is also a need in the art for a graphical development environment which tracks changes in subroutine APIs, so that those changes can automatically be reflected in all calls already made to that subroutine.

There is a further need in the art for a graphical development environment that graphically represents overwritable subroutines and improves their usefulness by enhancing their capabilities.

SUMMARY OF THE INVENTION

The above and other needs are met by a graphical development environment that graphically represents a program flow as a sequence of icons connected by arrows. The icons represent language components such as a while-loop, an if-branch, or a user-defined subroutine. The arrows represent the program flow between the icons. For example, each conditional branch is represented by an icon with several separate arrows branching out, and then returning back to a single program flow. Loop statements are represented by an arrow looping from an icon back to that icon.

A program flow has fixed beginning and end points, initially separated by a single arrow. A developer adds functionality to the program flow by adding icons on existing arrows. The graphical development environment automatically adjusts the program flow to include the new icon and its associated arrows.

For example, if the developer drops an icon representing a loop somewhere between the start and end of the program flow, the environment automatically inserts the icon into the flow at that point and draws an arrow representing the loop. Subsequently, the developer can add other language components within the loop merely by dropping those icons on the arrow representing the loop.

In addition, the graphical development environment displays user-defined subroutine call icons in various ways depending upon functionality. So, if the developer drops an icon calling a user-defined subroutine having multiple returns into the program flow, the development environment automatically draws the arrows representing each possible return from the subroutine. Each return has an associated fixed text label that was defined by the subroutine creator. Similarly, if the developer drops an icon calling a user-defined subroutine having no returns into the program flow, the development environment will show no returns from the subroutine. In this way, the graphical environment will indicate that the call flow stops inside the user-defined subroutine.

In addition, the graphical development environment automatically tracks changes to the APIs of all user-defined subroutines. A subroutine API consists of the parameters, returns, and comments used to interface with that subroutine. A change to any aspect of the API will automatically apply a defunct state to all icons referencing that subroutine. These defunct subroutine call icons are graphically represented by the environment to facilitate location and investigation of the potential ramifications of the API change. The subroutine call icon can be cleared of the defunct state to cause an automatic redraw of the icon and its returns.

In addition, the graphical development environment provides a graphical representation of overwritable subroutines. Additionally, overwritable subroutines are improved by enhancing the ability to modify default functionality. This improvement is accomplished by defining overwriting subroutines in the caller's environment so that even variables not passed through the parameter list can be referenced. The graphical development environment also enforces the requirement that overwritable and overwriting subroutines have the same parameter lists and return codes. When defining the overwriting subroutine, the graphical development environment displays but does not allow changes to the overwritable subroutine API. The graphical development environment also will indicate that a particular subroutine contains one or more overwritable functionalities by modifying the subroutine call icon. The graphical development environment will also allow multiple instances of overwriting subroutines for each overwritable subroutine by graphically pairing a particular overwriting subroutine with its associated subroutine call icon.

Accordingly, it is a technical advantage of the present invention to provide a graphical development environment wherein a developer can define program flow by placing icons at specific locations within the flow in which the development environment automatically redraws the arrows to include the icon and any program flow constructs, such as loops, introduced by that icon.

It is another technical advantage of the present invention to provide a graphical development environment that graphically displays subroutines having multiple returns such that the developer can view and manipulate each possible return.

It is yet another technical advantage of the present invention to provide a development environment that graphically displays changes to subroutine APIs to allow a developer to investigate and remedy each API change as it affects the call flow.

It is yet another technical advantage of the present invention to enable the usefulness of overwritable subroutines by providing a graphical representation, enhancing the ability to modify default functionality, enforcing the requirement for equivalent APIs, graphically indicating that a subroutine contains overwritable subroutines, and allowing each subroutine call to individually define overwriting subroutines.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 5A illustrates the scopes of subroutines according to the present invention; and FIG. 5B illustrates the scopes of subroutines according to the present invention.

DESCRIPTION OF THE PREFERRED EMBODIMENTS

Figure 1:
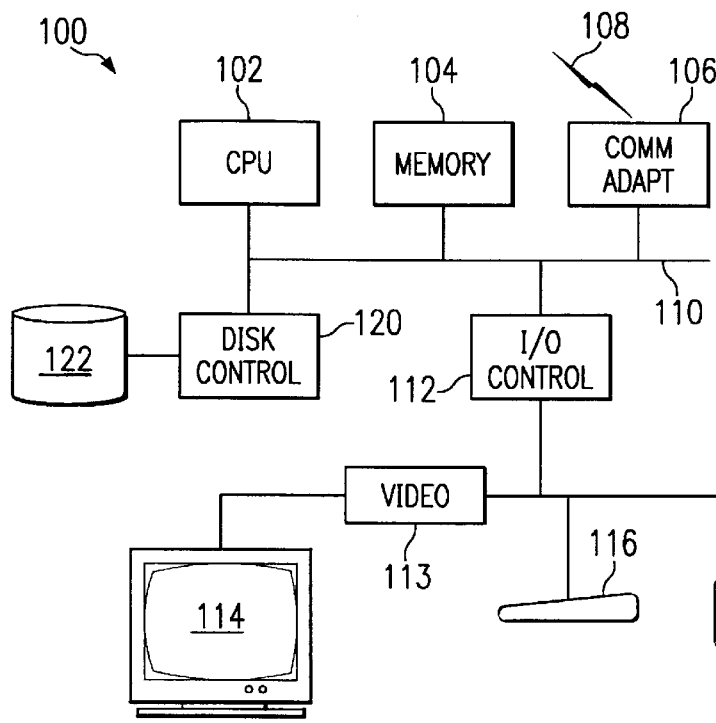
FIG. 1 illustrates a personal computer system adapted to execute the graphical development environment of the present invention.

FIG. 1 illustrates a personal computer system 100 (PC) adapted to execute the graphical development environment of the present invention. Illustrated are a central processing unit (CPU) 102 coupled via bus 110 to memory 104, communications adapter 106, disk controller 120 and input/output (I/O) controller 112. Disk controller 120 is coupled to storage device 122 and communications adapter 106 is coupled to network 108. I/O controller 112, in turn, is coupled to video controller 113, keyboard 116, and pointing device 118. Video controller 113 is coupled to display device 114.

As is well known in the computer arts, CPU 102 executes programs residing in storage device 122 and memory 104. The programs utilize video controller 113 to display results on monitor 114. A user or developer inputs commands into PC 100 via keyboard 116 and pointing device 118.

Moreover, the graphical development environment of the present invention is adapted to execute within an operating system having a graphical user interface (GUI). Therefore, the present invention can be adapted for use under IBM's OS/2™, Microsoft's WINDOWS 3.1™, WINDOWS 95™, or WINDOWS™, or UNIX X Windows™. A preferred embodiment of the present invention is the InVision™ application development tool. The InVision manual, document number 60.02.27 available from the Technical Documentation Department, InterVoice, Inc., 17811 Waterview Parkway, Dallas, Tex. 75252, is incorporated by reference herein.

A preferred embodiment of the graphical development environment of the present invention is used to develop programs for voice response systems in the telecommunications environment. Accordingly, this discussion refers to the flow of the program from start to finish as the "call flow." It must be understood, however, that the present invention can be used to develop any sort of application and is not limited to telecommunications.

Figure 2:
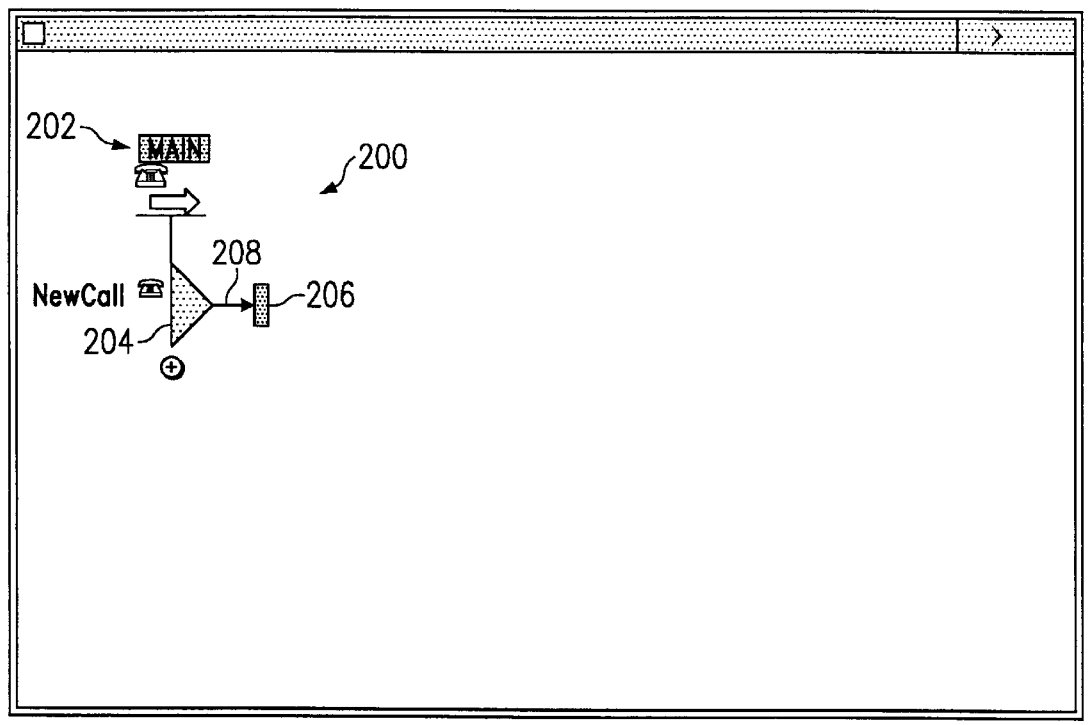
FIG. 2 illustrates the screen presented to the developer when designing a new call flow.

FIG. 2 illustrates the screen presented to the developer when designing a new call flow. The screen contains call flow diagram 200. Call flow diagram 200, in turn, is comprised of an icon 202 identifying it as the main routine, an icon 204 representing a new call, and an icon 206 representing the end of the call. A line 208, or arrow, extends from new call icon 204 to end of call icon 206 and represents the direction of the call flow. In FIG. 2, line 208 goes directly from icon 204 to icon 206 because the developer has not yet added call processing functionality to the call flow.

Note that each icon represents a function performed by the voice response system. Some icons represent functions that are predefined by the environment, while other icons represent functionality defined by the developer. In addition, each line connecting the icons has an arrow representing the direction of the program flow as it processes each icon. As can be seen from FIG. 2, the inventive graphical development environment assists the developer by abstractly describing the flow between program functions.

Figure 3:
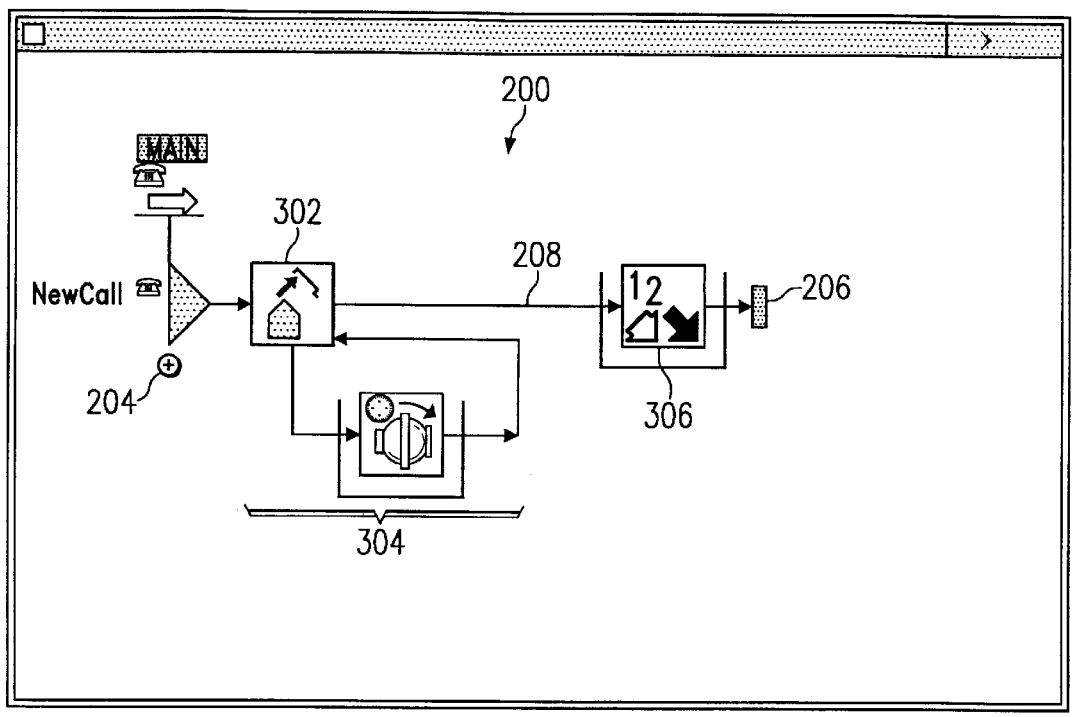
FIG. 3 illustrates subroutines placed into the call flow.

FIG. 3 illustrates how the developer can place icons into the call flow. Call flow 200 is displayed along with its associated icons. By using keyboard 116 and/or pointing device 118, the developer can select additional icons from an icon palette or menu and insert the icons into the call flow. For example, the developer can select new call icon 204 and then double click on a call answer icon from the palette; this would insert the call answer icon into the call flow after icon 204. Alternatively, the developer could drag the call answer icon from the palette and drop it on line 208 in between new call icon 204 and end of call icon 206.

As shown in FIG. 3, the developer has added call answer icon 302 to the call flow. The functionality represented by call answer icon 302 loops until it receives caller input. This loop is represented by loop and icon 304 which is attached to call answer icon 302. In addition, the developer has added an ask for number icon 306 to the call flow between call answer 302 and end of call 206.

As is apparent from FIG. 3, the graphical development environment according to the present invention automatically draws arrows among the icons. From these arrow and icons, the program flow through the various routines is immediately apparent to the developer. In addition, the developer can easily add functionality to the call flow. For example, adding functionality to loop 304 can be achieved by merely adding an icon to a desired location on the line representing the loop 304. The development environment will automatically redraw the call flow to include the new functionality.

Figure 4:
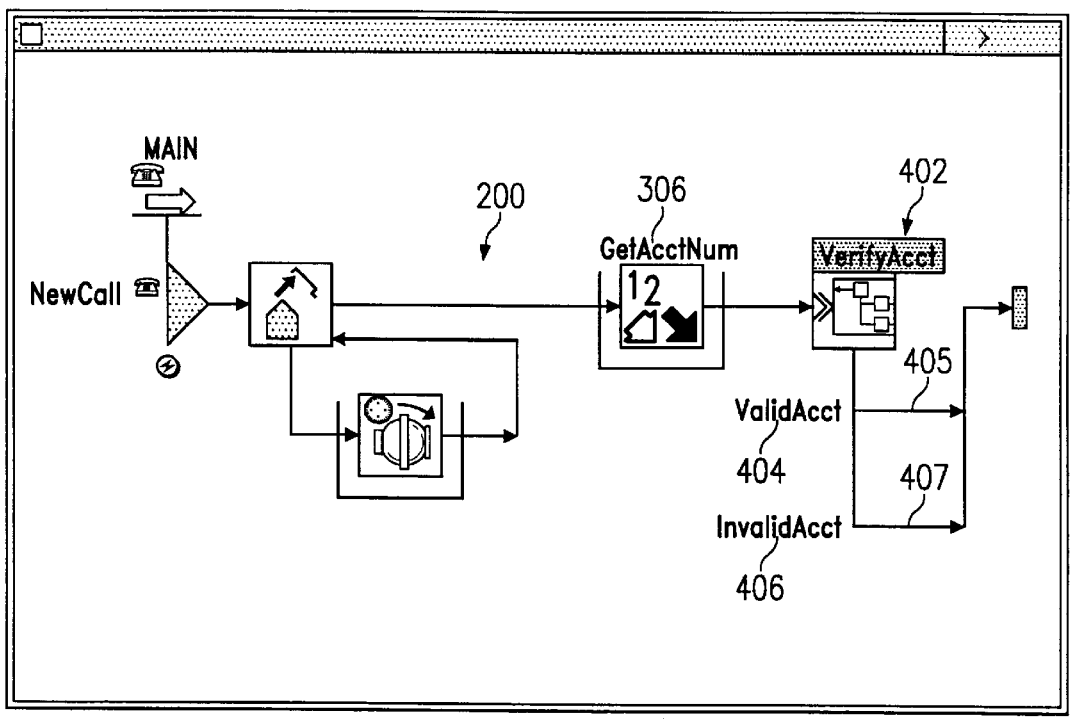
FIG. 4 illustrates a subroutine call having multiple returns.

FIG. 4 illustrates a subroutine call having multiple returns. Shown is the call flow of FIGS. 2–3, with the addition of a verify account icon 402 having multiple returns 404, 406. Note that the verify account icon 402 represents a user-defined subroutine. In addition, the icon 402 represents an entirely different call flow embedded within call flow 200 at the location indicated by icon 402. The verify account subroutine has two possible return values: valid account and invalid account. Valid account is represented by label 404 and arrow 405 while invalid account is represented by label 406 and arrow 407. Note that arrows 405 and 407 are automatically connected into the main call flow 200.

The structure demonstrated in FIG. 4 enables the developer to easily use subroutines having multiple returns. The developer can modify a subroutine's call flow to provide multiple returns. Then, each possible return is represented at the main call flow level by a label and an arrow connecting the return back to the main call flow. Accordingly, the developer does not need to memorize the possible returns because each one is graphically represented. Thus, the present invention reminds the developer that he or she must account for each return. Of course, the environment removes relevant labels and arrows when an icon is deleted from the call flow.

In addition, the graphical development environment automatically tracks changes to the APIs of all user-defined subroutines. A subroutine API consists of the parameters, returns, and comments used to interface with that subroutine. A change to any aspect of the API will automatically apply a defunct state to all icons referencing that subroutine. These defunct subroutine call icons are graphically represented by the environment to facilitate location and investigation of the potential ramifications of the API change. The subroutine icon can be cleared of the defunct state to cause an automatic redraw of the icon and its returns.

A preferred embodiment of the present invention allows the developer to save the call flow to one or more files. Each file can hold a plurality of different pages, wherein each page contains the call flow of a particular routine. Each page represents a different level of abstraction of the call flow. For example, one page may represent a subroutine as a number of interconnected icons while a higher level page may represent that subroutine as only a single icon.

An .APP file holds the call flow created by the developer. The .APP file can be composed of different pages, wherein each page contains the call flow of a particular routine in the main call flow. A .LIB file, in contrast, holds a library of subroutines that can be used by the developer in the APP file.

Subroutines can be defined in three different ways: 1) locally; 2) in a library; and 3) in a library with replaceable components. Each type of subroutine is reusable. To reuse a subroutine, the developer merely adds the icon representing the subroutine to a call flow.

Local subroutines can be called from any page in the same file, including from other local subroutines. Local subroutines cannot be called from other files, such as other .APP or .LIB files. The developer can use local subroutines for simple re-use of code.

Subroutines in a library, or callable subroutines, may be called from an .APP file or from any .LIB file. The developer can use callable subroutines if the subroutine is to be written independently of the .APP file and shared among other .APP or .LIB files. In addition, callable subroutines may have one or more replaceable components. A replaceable component is a portion of code within the callable subroutine that may be overwritten by the caller of that subroutine from the caller's environment (giving the overwriting routine access to all of the variables in the caller's data space).

FIG. 5 illustrates the scope of the above-listed subroutines. FIGURE 5A shows .APP file 502 and FIG. 5B shows .LIB file 504. APP file 502 contains main page 506, sub1 page 508 having a local subroutine, and sub2 page 510 having an overwriting subroutine. Main page 506 contains calls to subroutines sub1 and sub2.

.LIB file 504 contains sub3 page 512 having a callable subroutine, sub4 page 514 having a callable subroutine 514, sub5 page 516 having a local subroutine and sub2 page 518 having an overwritable subroutine. Subroutine sub3 calls subroutine sub5 and subroutine sub5 calls subroutine sub2. Note that each of the pages described with respect to FIG. 5 is represented by the present invention either as an individual icon or as a call flow having a sequence of icons.

When the program contained in the .APP file is loaded, sub2 page 510 will overwrite sub2 page 518. Thus, the developer can modify the functionality of sub2 page and thus the functionality of sub5 page 516 and sub3 page 512. The developer can use these techniques to customize the sub3 subroutine to work for his or her needs.

Note that a single application can have multiple overwriting subroutines that overwrite the same overwritable subroutine. In other words, a single application may overwrite an overwritable subroutine in several different ways. Thus, the call flow may have several different instances of an overwritten subroutine.

The present invention can also graphically represent that a particular subroutine contains overwritable components. For example, the present invention may place a colored border around the icon representing a subroutine containing overwritable components or change the icon's color. Alternatively, the present invention may draw a hole in the icon indicating that it contains overwritable components. Any graphical representation may be used as long as the environment indicates to the developer that a particular subroutine contains overwritable components.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A computer system having a display means, said computer system providing a graphical development environment for users, comprising:
   means for graphically representing a subroutine having at least one overwritable component on said display means; and
   means for graphically representing whether said subroutine has been overwritten.

2. The computer system of claim 1, further comprising:
   means for changing an application program interface (API) of said overwritable subroutine, wherein said API comprises parameters and returns for said overwritable subroutine; and
   means for graphically representing corresponding overwriting subroutines to flag said changed API.

3. The computer system of claim 2, wherein said means for graphically representing said corresponding overwriting subroutines changes a color of an icon.

4. The computer system of claim 2, wherein said means for graphically representing said corresponding overwriting subroutines changes a shape of an icon.

5. The computer system of claim 2, wherein changing said API causes icons to enter a defunct state and further comprising:
   means for clearing said defunct state; and
   means for automatically graphically representing a changed functionality of said API.

6. The computer system of claim 1, further comprising:
   means for developing overwriting components directly referencing variables in a caller's environment space.

7. The computer system of claim 1, further comprising:
   means for enforcing that an API of said overwritable subroutine is the same as an API of at least one of said corresponding overwriting subroutines, wherein said API comprises parameters and returns of said overwritable subroutine.

8. The computer system of claim 1, wherein said overwritable subroutine has a plurality of overwritable components and further comprising:
   means for a first instance of a call to said overwritable subroutine to overwrite any of said overwritable components; and
   means for a second instance of a call to said overwritable subroutine to overwrite any of said overwritable components.

9. A computer program product having a computer readable medium having computer program logic recorded thereon for graphically developing an application on a display means, said computer program product comprising:
   means for graphically representing a subroutine having at least one overwritable component on said display means; and
   means for graphically representing whether said subroutine has been overwritten.

10. The computer program product of claim 9, further comprising:
    means for changing an application program interface (API) of said overwritable subroutine, wherein said API comprises parameters and returns of said overwritable subroutine; and
    means for graphically representing corresponding overwriting subroutines to flag said changed API.

11. The computer program product of claim 10, wherein said means for graphically representing said corresponding overwriting subroutines changes a color of an icon.

12. The computer program product of claim 10, wherein said means for graphically representing said corresponding overwriting subroutines changes a shape of an icon.

13. The computer program product of claim 10, wherein changing said API causes icons to enter a defunct state and further comprising:
    means for clearing said defunct state; and
    means for automatically graphically representing a changed functionality of said API.

14. The computer program product of claim 9, further comprising:
    means for developing overwriting components directly referencing variables in a caller's environment space.

15. The computer program product of claim 9, further comprising:
    means for enforcing that an API of said overwritable subroutine is the same as an API of at least one of said corresponding overwriting subroutines, wherein said API comprises parameters and returns of said overwritable subroutine.

16. The computer program product of claim 9, wherein said overwritable subroutine has a plurality of overwritable components and further comprising:

means for a first instance of a call to said overwritable subroutine to overwrite any of said overwritable components; and means for a second instance of a call to said overwritable subroutine to overwrite any of said overwritable components.

17. A method of developing an application on a computer system having display means, comprising the steps of:

graphically representing a subroutine having at least one overwritable component on said display means; and graphically representing whether the subroutine has been overwritten.

18. The method of claim 17, further comprising the steps of:

changing an application program interface (API) of said overwritable subroutine, wherein said API comprises parameters and returns of said overwritable subroutine; and graphically representing corresponding overwriting subroutines to flag said changed API.

19. The method of claim 18, wherein said step of graphically representing said corresponding overwriting subroutines changes a color of an icon.

20. The method of claim 18, wherein said step of graphically representing said corresponding overwriting subroutines changes a shape of an icon.

21. The method of claim 18, wherein changing said API causes icons to enter a defunct state and further comprising the step of:

clearing said defunct state; and automatically graphically representing a changed functionality of said API.

22. The method of claim 17, further comprising the step of:

developing overwriting components directly referencing variables in a caller's environment space.

23. The method of claim 17, further comprising the step of:

enforcing that an API of said overwritable subroutine is the same as an API of at least one of said corresponding overwriting subroutines, wherein said API comprises parameters and returns of said overwritable subroutine.

24. The method of claim 17, wherein said overwritable subroutine has a plurality of overwritable components and further comprising the step of:

overwriting any of said overwritable components by a first instance of a call to said overwritable subroutine; and overwriting any of said overwritable components by a second instance of a call to said overwritable subroutine.

* * * * *